United States Patent [19]

Suzuki et al.

[11] Patent Number: 5,311,231
[45] Date of Patent: May 10, 1994

[54] LENS-FITTED PHOTOGRAPHIC FILM UNIT AND METHOD FOR ASSEMBLING THE SAME

[75] Inventors: Chiaki Suzuki, Kanagawa; Junichi Takagi; Seiji Asano, both of Saitama, all of Japan

[73] Assignee: Fuji Photo Film Co., Ltd., Kanagawa, Japan

[21] Appl. No.: 953,830

[22] Filed: Sep. 30, 1992

[30] Foreign Application Priority Data

Oct. 3, 1991 [JP] Japan .................................. 3-283586

[51] Int. Cl.⁵ .............................................. G03B 17/02
[52] U.S. Cl. ...................................... 354/288; 354/275; 354/174; 354/202
[58] Field of Search ................ 354/288, 275, 174, 202

[56] References Cited

U.S. PATENT DOCUMENTS

| | | | |
|---|---|---|---|
| 4,896,178 | 1/1990 | Ohmura et al. | 354/288 |
| 4,954,857 | 9/1990 | Mochida et al. | |
| 4,954,858 | 9/1990 | Ohmura et al. | 354/288 |
| 5,126,775 | 6/1992 | Nakai et al. | 354/288 |

*Primary Examiner*—Monroe H. Hayes
*Attorney, Agent, or Firm*—Young & Thompson

[57] ABSTRACT

A lens-fitted photographic film unit comprises a main body having a photograph-taking function and a rear cover for shielding the rear of the main body in a light-tight manner. The main body has a film supply chamber and a film take-up chamber both of which are provided with respective bottom openings. The film supply chamber is provided with a first side edge limiting plate so as partially to shield the bottom opening. The rear cover is provided with a cap for closing the bottom opening of the film supply chamber and a second side edge limiting plate. A winding shaft is engaged with a film leader of a photographic film, drawn from a photographic film cassette and positioned in a film supply chamber. Similarly, the empty photographic film cassette is positioned in a film take-up chamber. When the rear cover is attached to the main body, an arc-shaped cutout of the first side edge limiting plate faces an arc-shaped cutout of the second side edge limiting plate to form a circular opening through which the winding shaft is inserted and withdrawn. The winding shaft is rotated in the opening to wind up the film thereon. After forming a film roll, the winding shaft is pulled out of the film roll through the opening and the cap is closed to seal the unit light-tightly.

14 Claims, 5 Drawing Sheets

LENS-FITTED PHOTOGRAPHIC FILM UNIT AND METHOD FOR ASSEMBLING THE SAME

BACKGROUND OF THE INVENTION

1. Field of the Invention

The present invention relates to a lens-fitted photographic film unit and an assembling method therefor, and more particularly to a lens-fitted photographic film unit whose unexposed film roll contained in a film supply chamber can be formed properly in a factory.

2. Prior Art

There are widely prevalent lens-fitted photographic film units (hereinafter referred to simply as film units) which have a photographic film and a simple photograph-taking function incorporated therein. Such film units are available at shops at low prices so as to take photographs without the need for carrying about heavy and expensive cameras. These film units are designed to attract customers at low prices not much higher than the price of photographic film cassettes, by providing them with simple structures.

The film units comprise a film housing and an outer casing for imparting a decorative external appearance to the film units. The film housing has a main body provided with a shutter mechanism, a taking lens, a film advancing mechanism and so forth, a front cover attached to the front of the main body and a rear cover attached to the rear of the main body. The main body includes a film take-up chamber for loading a photographic film cassette and a film supply chamber for containing a film roll which is formed by coiling an unexposed photographic film strip which has been drawn out of the photographic film cassette.

FIG. 5 illustrates a conventional way of inserting a film roll 51a in a film supply chamber 50. An unexposed photographic film 51 is wound in a roll about a winding shaft 52 so as to form the film roll 51a in a darkroom of a factory, which roll is then inserted in the film supply chamber 50 by the winding shaft 52. When the winding shaft 52 is withdrawn from the film supply chamber 50, loosening of the film roll 52a occurs so that the upper portion of the film roll 51a rises to impart to the film roll 51a an oval shape. When a rear cover (not shown) is attached to a main body in this condition, the film roll 51a is deformed, and this deformation induces a larger film advancing torque or resistance to advance. In order to eliminate this problem, a pressing jig 53 is used to press the upper portion of the film roll 51a so as to prevent the film roll 51a from ballooning to an oval shape.

Furthermore, when the winding shaft 52 is pulled from the film roll 51a, a side edge of the film roll 51a projects outside the film supply chamber 50 in a spiral, because of the movement of the winding shaft 52. In this condition, the rear cover crushes the projecting side portion, which can result in failure of film advance. For preventing this, upon winding a photographic film 51, the side edge of the film roll 51a is brought into contact with a side edge straightening jig 54 which is initially fitted on the winding shaft 52. The film roll 51a is inserted in the film supply chamber 50 in such a manner that the side edge straightening jig 54 fits into a bottom opening of the film supply chamber 50. The side edge straightening jig 54 is removed after the winding shaft 52 is pulled completely from the film roll 51a.

However, the pressing jig 53 must be removed prior to attaching the rear cover, which causes loosening of the film roll 51a as well. Besides, the diameter of the film roll of a photographic film for 24 frames is different from that of a photographic film for 36 frames, so that it is required to use a different size of pressing jig in each case, which is troublesome and time consuming.

Also, it is necessary to remove the side edge straightening jig 54 after the tendency of the film roll 51a to protrude has been corrected. This is another factor that reduces the speed of assembly. Moreover, when the side edge straightening jig 54 as well as the film roll 51a is inserted in the film supply chamber 50, the side edge straightening jig 54 is brought into contact with the edge of the bottom opening of the film supply chamber 50, which may produce foreign particles since the edge of chamber 50 is rubbed by the side edge straightening jig 54. Especially in the case of photographic film of 24 frames, since the diameter of the film roll is smaller than that of a photographic film of 36 frames, contact pressure between the edge of the bottom opening of the film supply chamber 50 and the side edge straightening jig 54 is high, which increases the chance of foreign particles.

OBJECTS OF THE INVENTION

It is an object of the present invention to provide a lens-fitted photographic film unit and an assembling method therefor capable of preventing a film roll from loosening into an oval shape, without the need to use a pressing jig.

It is another object of the present invention to provide a lens-fitted photographic film unit and an assembling method therefor capable of preventing a side edge of a film roll from projecting in a spiral form, without the need to use a side edge straightening jig.

SUMMARY OF THE INVENTION

In order to achieve the above and other objects of the present invention, a lens-fitted photographic film unit has a rear cover which includes a rear section for covering light-tightly the rear side of a main body, and a cap, formed integrally and swingably by a thin connection to the rear section, for covering light-tightly a bottom opening of a film supply chamber.

In an assembly method of the present invention, a winding shaft is engaged with a leading end of an unexposed photographic film protruding from a photographic film cassette and positioned in the film supply chamber while the photographic film cassette is contained in a film take-up chamber. Then, the rear cover is attached to the main body with the cap open. Thereafter, the winding shaft is rotated to form a film roll in a darkroom. Finally, the cap is closed after withdrawing the winding shaft from the film supply chamber.

According to this construction, it is possible to insert the photographic film cassette and attach the rear cover in a lighted room and to prevent the film roll from being loosened into an oval shape and deformed by the rear cover.

In a preferred embodiment, a first side edge limiting plate is provided at the bottom of the film supply chamber, and has an arc-shaped cutout for receiving the winding shaft. The first side edge limiting plate prevents the film roll from protruding in a spiral form when withdrawing the winding shaft from the film supply chamber.

In another preferred embodiment, a second side edge limiting plate is provided on said rear section of the rear cover in the vicinity of the thin connection and has an arc-shaped cutout at its free end. When the rear cover is attached to the main body, the two arc-shaped cutouts face each other to form a hole through which the winding shaft is projected and rotated.

BRIEF DESCRIPTION OF THE DRAWINGS

The above and other objects and advantages of the present invention will become more apparent from the following detailed description with reference to the accompanying drawings, in which.

DETAILED DESCRIPTION OF THE PREFERRED EMBODIMENTS

Figure 1:
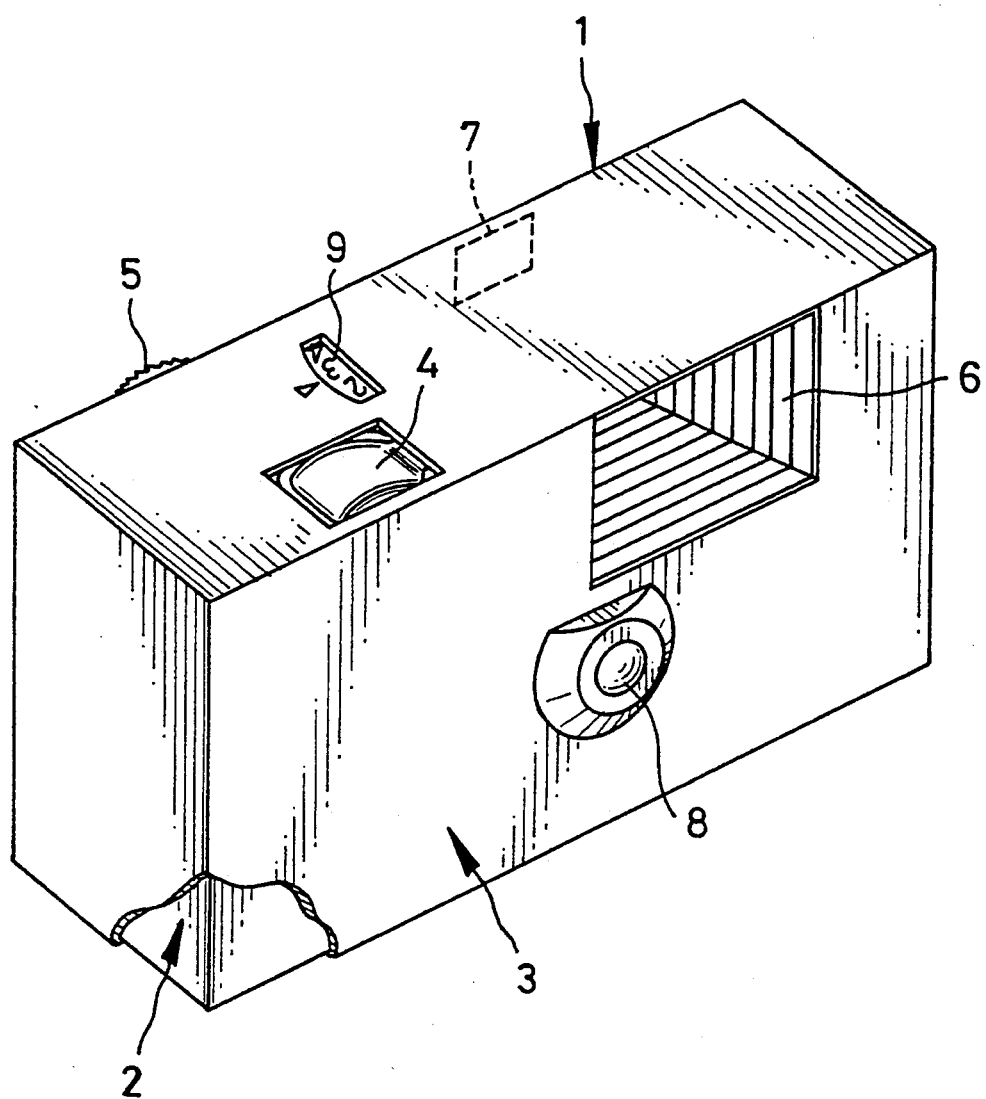
FIG. 1 is a perspective view of a lens-fitted photographic film unit according to the present invention.

In FIG. 1, there is shown a lens-fitted photographic film unit 1 which consists of an outer casing 3 and a film housing 2 provided with a photograph-taking function. The outer casing 3 is formed of a cardboard or the like having illustrations and information so as to impart a decorative appearance to the film unit 1. The outer casing 3 has openings for exposing a shutter release button 4, a film advancing wheel 5, a front finder window 6, a rear finder window 7, a taking lens 8 and a film frame counter disk 9, so that a user can operate those without removing the outer casing 3 from the film housing 2. The outer casing 3 can be omitted since its purpose is limited to ornamentation and information. Furthermore, decorative paper may be attached to an outside portion of the film housing 2 in place of the outer casing 3.

Figure 2:
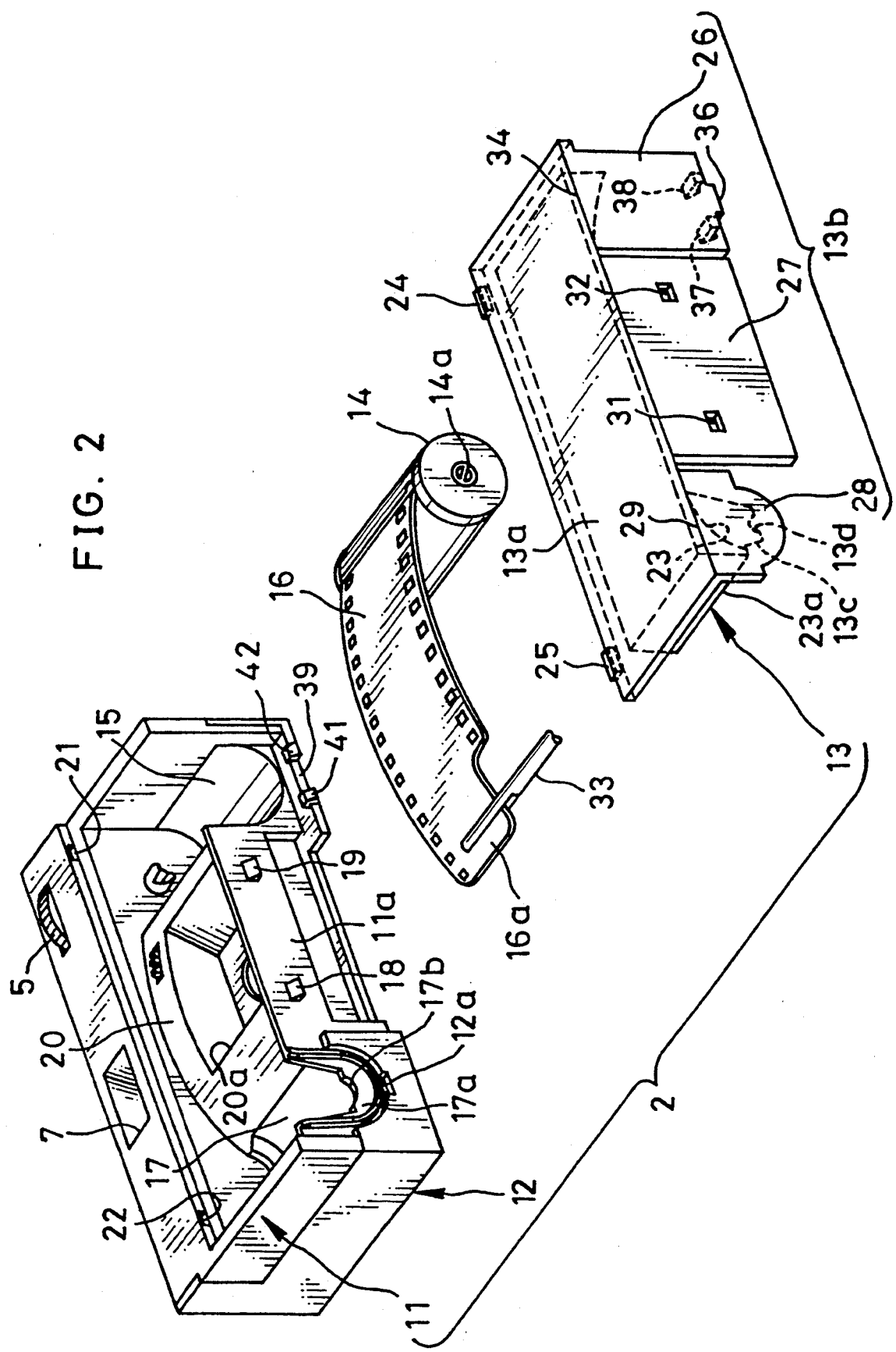
FIG. 2 is an exploded perspective view of a film housing of the film unit.

In FIG. 2, the film housing 2 is constituted of a main body 11, a front cover 12 and a rear cover 13, all of which are molded of plastic. The main body 11 has the taking lens 8, a shutter mechanism, a film advancing mechanism and the film frame counter disk 9. Moreover, the main body 11 has a film take-up chamber 15 and a film supply chamber 17 with an exposure frame 20 therebetween. The film take-up chamber 15 contains a photographic film cassette 14 while the film supply chamber 17 contains a film roll 16b (see FIG. 4) which is formed by drawing an unexposed photographic film 16 from the photographic film cassette 14 and winding it in a roll beginning with a film leader 16a. The exposure frame 20 is curved to compensate the distortion of the taking lens 8 and is formed with an exposure opening 20a so that light from the taking lens 8 is directed toward the photographic film 16 through the exposure opening 20a. A trailer of the photographic film 16 is secured to a spool shaft 14a of the photographic film cassette 14.

The main body 11 has openings on its rear side as well as on the bottom sides of the film take-up chamber 15 and the film supply chamber 17. The rear cover 13 is removably attached to the main body 11 so as to shield the inside of the main body 11 from external light. Engaging claws 18 and 19 are integrally formed on a bottom portion 11a of the main body 11 to be fitted into engaging holes 31 and 32 of the rear cover 13. Holes 21 and 22 for attaching the rear cover 13, are formed in upper portions of the film take-up chamber 15 and the film supply chamber 17.

The bottom of the film supply chamber 17 is provided with a side edge limiting plate 17a so as to define the position of a side edge of the film roll 16b.

In the assembly method of the present invention, a winding shaft 33 is first engaged with the film leader 16a of the photographic film 16 and the winding shaft 33 as well as the film leader 16a is positioned in the film supply chamber 17 in a lighted room before attaching the rear cover 13 to the main body 11. Thereafter, in a darkroom, the winding shaft 33 is rotated to form the film roll 16b so that the emulsion surface of the photographic film 16 is located inward relative to the back surface thereof. Then, the winding shaft 33 is pulled from the film roll 16b. At this time, the side edge of the film roll 16b would otherwise be liable to protrude in a spiral form as a result of the movement of the winding shaft 33. But the side edge limiting plate 17 prevents the side edge of the film roll 16b from projecting. The side edge limiting plate 17a has an arc-shaped cutout 17b to receive the winding shaft 33.

The rear cover 13 is approximately L-shaped and consists of a rear section 13a for covering the rear of the main body 11 and a bottom section 13b for covering the bottom of the main body 11. The rear section 13a is formed integrally on its inner side with a film guide surface 23 which has a curved surface corresponding to the curved surface of the exposure frame 20. Projections 24 and 25 are formed integrally on the top edge of the rear section 13a and are insertable in the holes 21 and 22.

The bottom section 13b consists of a swingable cap 26 for covering the bottom of the film take-up chamber 15, a bottom plate 27 for contacting the bottom portion 11a of the main body 11, and a swingable cap 28 for covering the bottom opening of the film supply chamber 17. The caps 26 and 28 may be formed separately from the rear cover 13. The bottom plate 27 is formed with the engaging holes 31 and 32 described above. Thus, the rear cover 13 is attached removably to the main body 11 by inserting the projections 24, 25 into the holes 21, 22 and the engaging claws 18, 19 into the engaging holes 31, 32.

Figure 3:
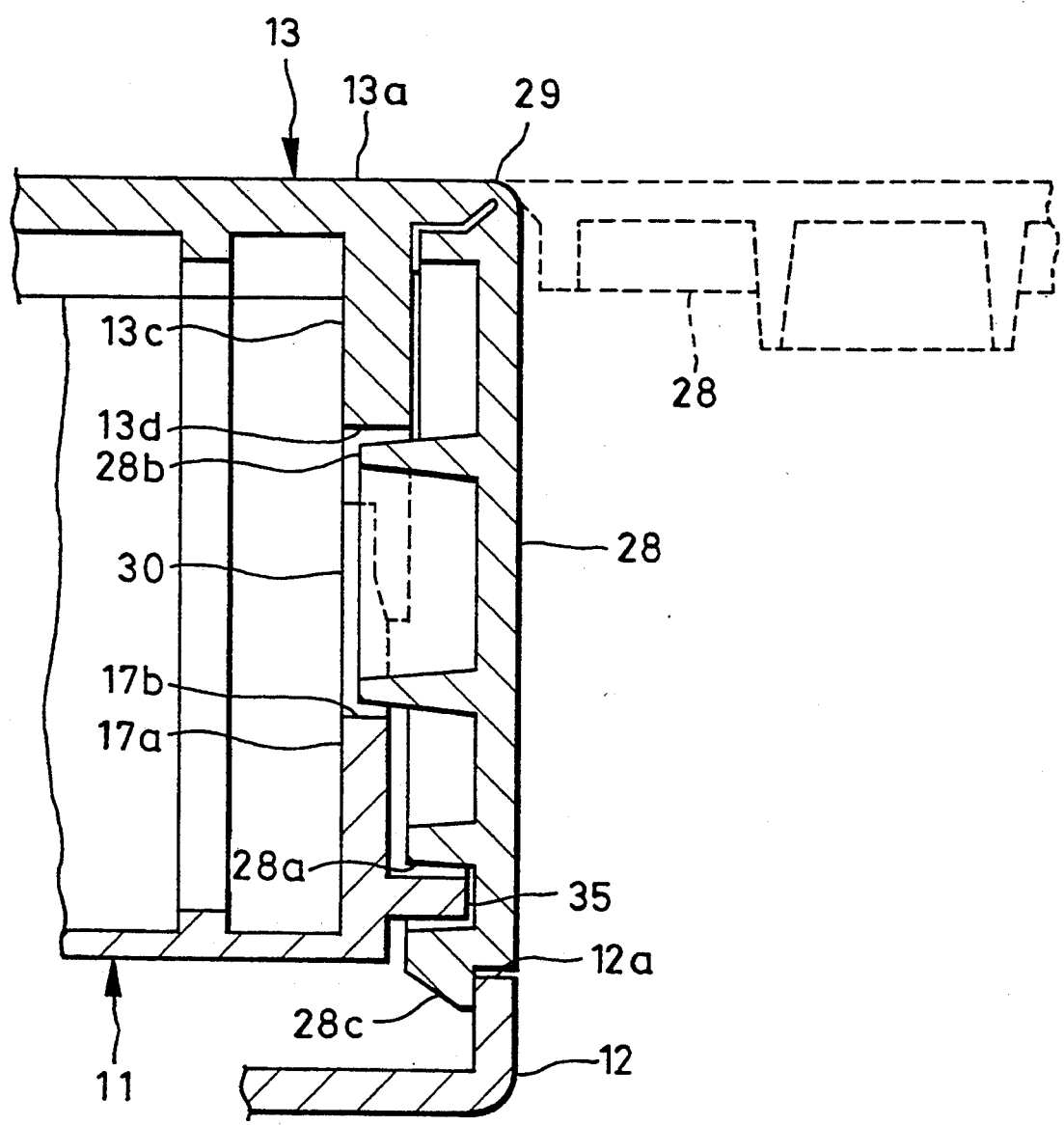
FIG. 3 is a sectional view illustrating a film supply chamber of the film unit.
Figure 4:
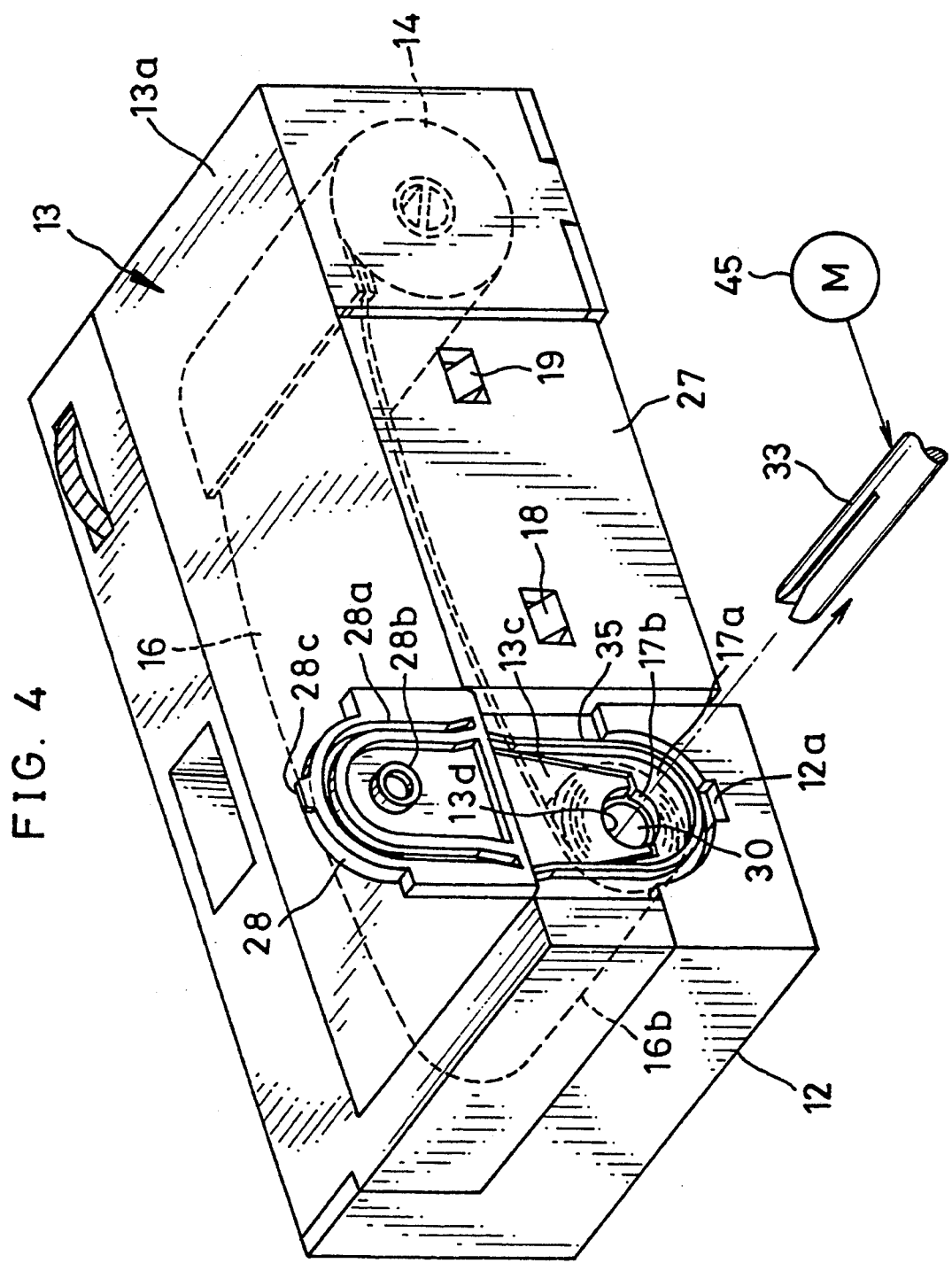
FIG. 4 is a perspective view of the film housing prior to closing the cap.
Figure 5:
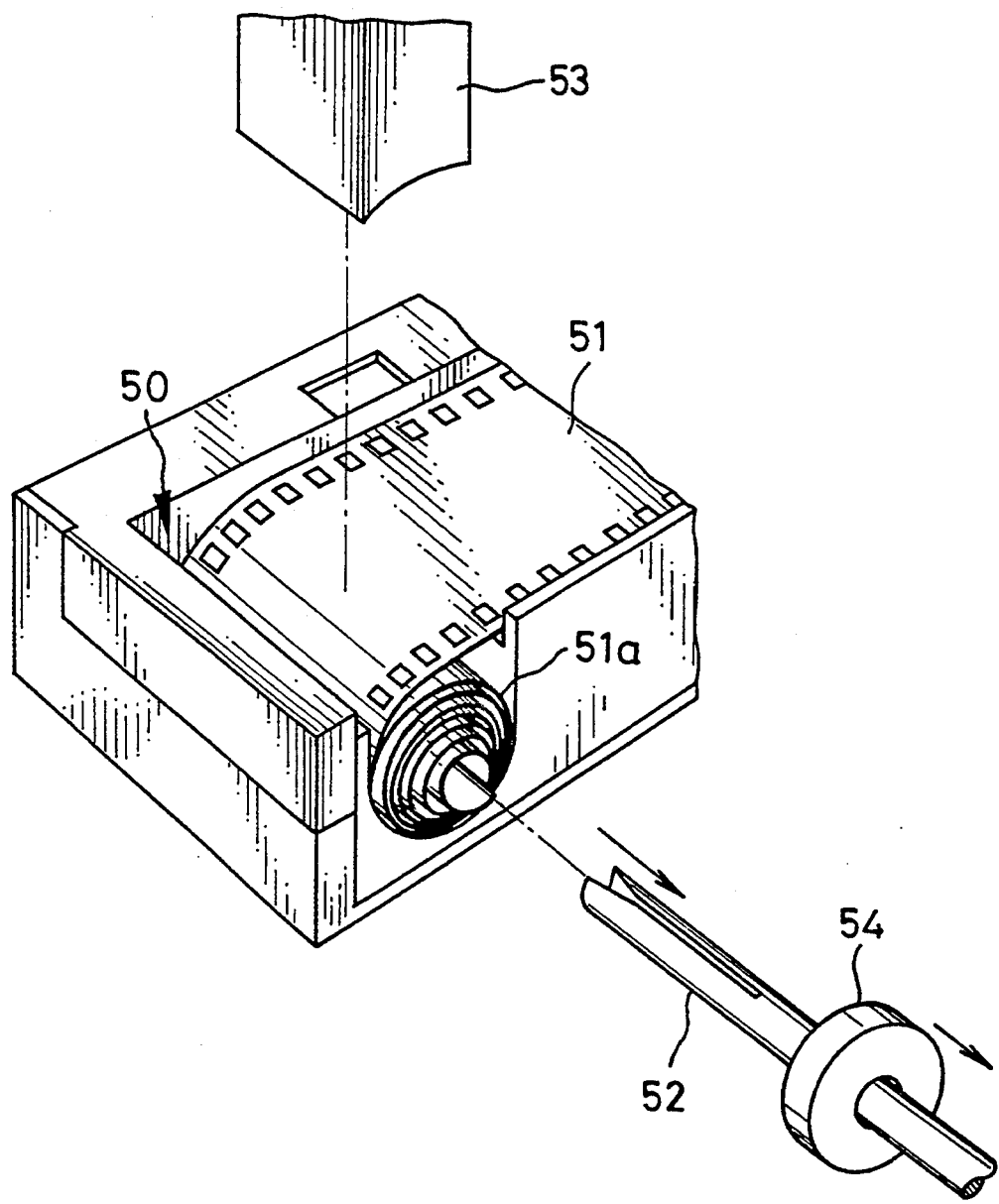
FIG. 5 is an explanatory view illustrating the loading of a film roll into a film supply chamber of a conventional film unit.

As illustrated in FIGS. 3 and 4, the cap 28 is swingably connected to rear cover 13 by a thin web 29. A side edge limiting plate 13c is formed on the rear section 13a in the vicinity of the web 29 so as to define the side edge of the film roll 16b as does also the side edge limiting plate 17a. The wide edge limiting plate 13c has an arc-shaped cutout 13d in its free edge. When the rear cover 13 is attached to the main body 11, a circular opening 30 is formed by the cutouts 13d and 17b, which opening receives the winding shaft 33.

In order to prevent external light from entering the film supply chamber 17, the side edge limiting plate 17a is provided with a ridge 35 and the cap 28 is provided on its inside surface with a groove 28a into which the ridge 35 is fitted. Also, the cap 28 is provided with a circular ridge 28b corresponding to the opening 30. The circular ridge 28b serves to push and straighten the side edge of the film roll 16b which is liable to protrude at its center upon withdrawal of the winding shaft 33. An engaging claw 28c is formed on a free end of the cap 28 and is fitted in an engaging hole 12a formed in the front cover 12.

The cap 26 is swingable about a thin web 34 by which it is attached to rear cover 13. The free end of the cap 26 is formed integrally with a projection 36 and engaging claws 37 and 38, whereas the front cover 12 is formed with a cutout 39 and tapered protrusions 41 and 42. Accordingly, when the cap 26 is swung and pressed against the main body 11, the engaging claws 37 and 38 engage with the protrusions 41 and 42 to cause the cap 26 to be held firmly closed against the front cover 12, whereby the film take-up chamber 15 is closed in a light-tight fashion. When removing the photographic film cassette 14 for development, the cap 26 can be opened by pulling up the projection 36 with a tool.

The manufacture of the film unit 1 will now be described. First, the taking lens 8, the shutter mechanism, the film advancing mechanism, the film frame counter disk 9 and the like are mounted on the main body 11, whose front side is then removably covered by the front cover 12. The front cover 12 may be adhered to the main body 11 in order to prevent the taking lens 8 from displacing from the main body 11, as the taking lens 8 is pressed by the front cover 12.

Thereafter, the photographic film cassette 14 is loaded into the film take-up chamber 15 from the rear side while the film winding shaft 33 is caught with the film leader 16a of the photographic film 16 protruding from the photographic film cassette and positioned in the film supply chamber 17. At this time, the winding shaft 33 projects to the outside of the main body 11 through the cutout 17b of the side edge limiting plate 17a.

Next the rear cover 13 is attached, by inserting the projections 24 and 25 into the holes 21 and 22 with the rear cover 13 inclined slightly obliquely with respect to the main body 11. The rear section 13a of the rear cover 13 is pressed toward the main body 11 to cause the rear cover 13 to be attached to the main body 11 by interengagement of the engaging holes 31, 32 of the cap 27 and the engaging claws 18, 19 of the main body 11. The cap 26 is then closed to shield the film take-up chamber 15 in a light-tight fashion.

After the attachment of the rear cover 13, the film unit 2 is transferred from a lighted room to a darkroom, where the winding shaft 33 projecting through the opening 30 is rotated counterclockwise by a motor 45. As rotation of the winding shaft 33 progresses, the photographic film 16 is drawn from the photographic film cassette 14 and wound around the winding shaft 33 to make the film roll 16b. When almost all the photographic film 16 has thus been drawn out of the photographic film cassette 14, the resistance encountered by the winding shaft 33 increases since the film trailer of the photographic film 16 is secured to the spool shaft 14a. When this increase in resistance is detected, the motor 45 is stopped and the winding shaft 33 is withdrawn through the opening 30.

At this time, the side edge of the film roll 16b would tend to project spirally, following the movement of the winding shaft 33, but is prevented from doing so by the side edge limiting plates 13c and 17a. Although the film roll 16b is loosened slightly at this time, its shape becomes not oval but rather circular, thanks to the film guide surface 23. Thereafter, the cap 28 is swung toward the opening 30. As a result, the ridge 35 is fitted into the groove 28a and the ridge 28b enters the opening 30. Also, the engaging claw 28c comes into engagement with the engaging hole 12a of the front cover 12, whereby upon completion of swinging of the cap 28 the whole bottom of the film supply chamber 17 including the opening 30 is closed in a light-tight fashion. Although the central portion of the film roll 16b will have slightly protruded when the winding shaft 33 is withdrawn, the ridge 28b enters the opening 30 so that this protruding central portion is pushed back to a desirable position.

It is now possible to take photographs with the film unit 2 encased in the outer casing 3. The depression of the shutter release button 4 causes the shutter mechanism to be actuated. Thereby, light passing through the taking lens 8 falls on the photographic film 16 positioned at the rear of the exposure opening 20a. Upon rotating the film advancing wheel 5 after an exposure, the exposed frame is wound into the photographic film cassette and another unexposed portion of the photographic film 16 is advanced into registry with the exposure frame. When all the available frames have been thus exposed, the entire photographic film 16 will have been wound back into the photographic film cassette 14.

Then, the film unit 1 is forwarded to a photofinishing laboratory for processing. In the photofinishing laboratory, after removing the outer casing 3 from the film housing 2, the cap 26 is opened and the photographic film cassette 14 containing all the exposed film is removed from the bottom of the film take-up chamber 15. The photographic film in cassette 14 is subjected to processing. Finished photoprints and the developed photographic film are returned to the customer.

The side edge limiting plates are provided both on the main body and on the rear cover in the above embodiment, but one of them may be omitted. Furthermore, various modifications within the scope and spirit of the invention will be apparent to people of ordinary skill in this technological field. Thus, the invention should be considered as being limited only by the scope of the appended claims.

What is claimed is:

1. A lens-fitted photographic film unit having a main body which includes a film take-up chamber for containing a photographic film cassette and a film supply chamber for containing a film roll formed after drawing a photographic film from said photographic film cassette, there being an exposure frame between said chambers, said lens-fitted photographic film unit comprising:
   a bottom opening formed in a bottom of said film supply chamber;
   a rear cover including a rear section covering the rear of said main body;
   a first cap for closing said bottom opening of said film supply chamber; and
   side edge limiting means integral with said film unit and permitting a film winding shaft to be inserted into said film supply chamber to wind said film roll thereon but preventing a side edge of said film roll from protruding in a spiral from within said film supply chamber toward the outside thereof when said winding shaft is subsequently pulled out of said film supply chamber.

2. A lens-fitted photographic film unit as recited in claim 1, wherein said first cap is integrally and swingably connected with said rear section by a thin flexible web.

3. A lens-fitted photographic film unit as recited in claim 1, wherein said rear cover includes a second cap swingably secured to said rear cover for closing an opening formed in a bottom of said film take-up chamber.

4. A lens-fitted photographic film unit as recited in claim 3, wherein said second cap is integrally and swingably connected with said rear section by a thin flexible web.

5. A lens-fitted photographic film unit as recited in claim 1, wherein said rear section has a curved portion facing said film supply chamber so as to prevent said film roll from being loosened into an oval shape.

6. A lens-fitted photographic film unit as recited in claim 1, wherein said side edge limiting means includes a first side edge limiting plate which is provided on said main body at the bottom of said film supply chamber so as to shield a portion of said bottom opening.

7. A lens-fitted photographic film unit as recited in claim 6, wherein said first side edge limiting plate has a first arc-shaped cutout so as to receive said winding shaft.

8. A lens-fitted photographic film unit as recited in claim 6, wherein said side edge limiting means further includes a second side edge limiting plate which is formed on said rear section proximate said first cap and shields a portion of said bottom opening, when said rear cover is attached to said main body.

9. A lens-fitted photographic film unit as recited in claim 8, wherein said second side edge limiting plate has a second arc-shaped cutout, which forms together with said first cutout a hole through which said winding shaft is inserted and withdrawn.

10. A lens-fitted photographic film unit as recited in claim 6, wherein said first side edge limiting plate has a ridge and said first cap has a groove into which said ridge is fitted so as to prevent external light from entering.

11. A lens-fitted photographic film unit as recited in claim 9, wherein a circular ridge is formed on said first cap and enters said hole so as to push back a central portion of the side edge of said film roll which slightly protrudes after withdrawing said winding shaft from said film supply chamber.

12. A method for assembling a lens-fitted photographic film unit which includes a main body and a rear cover, said main body having a film take-up chamber for containing a photographic film cassette and a film supply chamber frr containing a photographic film in a roll formed after drawing a photographic film from said photographic film cassette, said method comprising the steps of:

engaging a leader of said photographic film with a winding shaft;

disposing said winding shaft and said photographic film cassette respectively in said film supply chamber and said film take-up chamber, said winding shaft protruding from a first bottom opening formed in a bottom of said film supply chamber;

attaching said rear cover to said main body, said rear cover covering a rear surface of said main body in a light-tight manner but leaving an opening of a size sufficient to permit withdrawal of said winding shaft while preventing withdrawal of said film;

rotating said winding shaft so as to draw said photographic film from said photographic film cassette and to wind said photographic film in a roll on said winding shaft;

withdrawing said winding shaft from said film supply chamber to separate said winding shaft from said roll of photographic film; and covering said first bottom opening of said film supply chamber with a first cap so as to shield said first bottom opening in a light-tight manner.

13. A method as recited in claim 12, wherein said first cap is swingably mounted on and integral with said rear cover and is swung to close said first bottom opening.

14. A method as recited in claim 12, wherein said film take-up chamber has a second bottom opening and a second cap is swingably mounted on and integral with said rear cover and is swung to close said second bottom opening so as to shield said second bottom opening in a light-tight manner.

* * * * *